United States Patent
Grant et al.

(10) Patent No.: US 6,930,427 B2
(45) Date of Patent: Aug. 16, 2005

(54) ELECTRIC APPARATUS HAVING A STATOR WITH INSULATED END LAMINATIONS WITHIN THE CENTRAL OPENING OF END PLATES

(75) Inventors: Barron D. Grant, Gainesville, GA (US); Thomas S. Cufr, Gainesville, GA (US); Thomas S. Evon, Easley, SC (US); Grayson W. Lambert, Jr., Gainesville, GA (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 110 days.

(21) Appl. No.: 10/261,063

(22) Filed: Sep. 30, 2002

(65) Prior Publication Data

US 2004/0061408 A1 Apr. 1, 2004

(51) Int. Cl.[7] ................................................ H02K 3/34
(52) U.S. Cl. ........................ 310/217; 310/215; 310/216
(58) Field of Search ................................ 310/214–217, 310/194, 261, 254, 259

(56) References Cited

U.S. PATENT DOCUMENTS

| | | | |
|---|---|---|---|
| 1,156,639 A | * 10/1915 | Starker | 310/258 |
| 2,876,371 A | * 3/1959 | Wesolowski | 310/217 |
| 4,485,320 A | 11/1984 | Kawada et al. | 310/217 |
| 4,490,638 A | 12/1984 | Lind | 310/269 |
| 4,603,273 A | 7/1986 | McDonald | 310/89 |
| 4,644,210 A | * 2/1987 | Meisner et al. | 310/211 |
| 4,904,893 A | * 2/1990 | Snider et al. | 310/260 |
| 5,140,211 A | 8/1992 | Ucida | 310/156.61 |
| 5,243,246 A | * 9/1993 | Sakamoto | 310/179 |
| 5,378,953 A | 1/1995 | Uchida et al. | 310/156.59 |
| 5,398,397 A | 3/1995 | Johnson | 29/596 |
| 6,057,624 A | 5/2000 | Ohtake et al. | 310/214 |
| 6,608,420 B2 | 8/2003 | Hsieh | 310/217 |

FOREIGN PATENT DOCUMENTS

| | | | |
|---|---|---|---|
| JP | 08-070544 | * 3/1996 | H02K/3/34 |
| JP | 2000060052 | 2/2000 | H02K/3/50 |

OTHER PUBLICATIONS

Translation of Abe et al. "Insulation structure of stator core", Mar. 1996.*

* cited by examiner

Primary Examiner—Karl E. Tamai
(74) Attorney, Agent, or Firm—Patrick S. Yoder; Alexander M. Gerasimow (57) ABSTRACT

A technique is provided for manufacturing a stator of an electrical machine, such as a motor. The stator is formed by using thin end plates or laminations that are attached to each other by rods around a group of laminations. The end plates maintain pressure on the laminations. Within the laminations, slots extend thru the length of the stator. A slot liner is placed within each slot as an insulating layer between coils and the laminations. Furthermore, an insulating end piece or lamination is positioned within each end plate and adjacent to the laminations to provide support to the slot liners that extend beyond the laminations. The insulating end lamination supports the slot liners during the winding processes to prevent the slot liners from damage. In addition to providing support, the insulating end lamination is able to provide extra insulation between the coils, laminations, and the end plate. Moreover, by having thin end plates, the motor may be wound by automated processes to reduce the cost of manufacture.

21 Claims, 7 Drawing Sheets

ELECTRIC APPARATUS HAVING A STATOR WITH INSULATED END LAMINATIONS WITHIN THE CENTRAL OPENING OF END PLATES

BACKGROUND OF THE INVENTION

The present invention relates generally to the field of electric motors and methods and apparatus for manufacturing electric motors. More particularly, the invention relates to a novel technique for manufacturing motors that may be machine wound.

Electric motors of various types are omnipresent in industrial, commercial and consumer settings. In industry, such motors are employed to power all types of rotating machinery, such as pumps, conveyors, compressors, fans and so forth, to mention only a few. Conventional alternating current electric motors may be constructed for single or multiple phase operation, and are typically specifically designed to operate at predetermined synchronous speeds, such as 3600 rpm, 1800 rpm, 1200 rpm and so on. Such motors generally include a stator, comprising a multiplicity of coils, surrounding a rotor, which is supported by bearings for rotation in the motor frame. In the case of AC motors, alternating current power applied to the motor causes the rotor to rotate within the stator at a speed which is a function of the frequency of alternating current input power and of the motor design (i.e., the number of poles defined by the motor windings and rotor resistance). In DC motors power is similarly applied, and the speed of the motor may be controlled in a variety of manners. In both cases, however, a rotor shaft extends through the motor housing and is connected to elements of the machinery driven by the electric motor.

In conventional electric motors, conductors, known as stator windings, are routed through parallel slots formed around the inner periphery of a metallic core. The stator windings are electrically connected in groups around the stator core to form electro-magnetic coils. The coils establish the desired electro-magnetic fields used to induce rotation of the rotor. The number and locations of the windings in the stator core generally depends upon the design of the motor (e.g., the number of poles, the number of stator slots, the number of winding groups, and so forth). Each winding coil includes a number of turns of wire that loop around end or head regions of the stator between the slots in which the winding coil is installed. Multiple conductors are wound in each slot in a randomly wound stator. Following installation in the slots, the coils in each group are generally pressed into a bundle at either end of the stator. The stator windings are connected to electrical wiring that is routed from the stator to a wiring or conduit box located either within the motor frame or on the outside of the motor through corresponding holes in the motor frame and the conduit box.

The process for installing the coils within the stator generally includes inserting the coils, lacing the coils, and forming the coils into bundles, which may be referred to as winding the stator. Each of these processes may be completed by hand as a manual process or by machine as an automated process. The insertion process typically involves guiding the coil or coils into a slot and pulling the coil through the entire length of the slot. After pulling the coil through the slot, the coil may be redirected and pulled through the entire length of another slot. Once the coils are inserted into the slots, a lacing process may be utilized to wrap string or other suitable binding material around the exposed coils at the ends of the stator. This process is used to bundle the coils together into a group. Another process that is typically used in manufacturing a motor is the forming process. In the forming process, the coils are formed into bundles that are adjusted and manipulated into specific dimensions for the motor. In addition to these processes, other processes may be used to wind the stator.

While conventional motor manufacturing equipment and methods have been generally satisfactory in many applications, they are not without drawbacks. For example, one of the approaches that may be utilized to insert coils into the stator's slots may be a hand winding process. The hand winding process typically requires numerous people to pull and guide the coils through the various slots. This type of process is more expensive because it requires a larger labor force to complete the task, which results in an increase in the cost of the motors. Another approach that is typically utilized is a machine winding process. The machine winding process requires fewer personnel and utilizes a machine to install the coils into the slots. This type of process has a lower labor cost, which reduces the associated cost of manufacturing the motor as well.

Furthermore, conventional motor manufacturing components for square motors have additional drawbacks related to the methods for assembling and winding the stator for the square frame. For example, each stator winding is typically inserted, laced, and formed by a manual process with the conventional components. Typically, at each end of the stator, an end plate is attached as part of or to the metallic core. Conventional end plates for a square motor generally extend beyond the end of the slots within the metallic core. The portion of the endplate that extends beyond the slots hinders automated winding processes for the motor. Thus, the motor is typically hand wound, due to the over-extending end plate.

Moreover, conventional techniques for manufacturing a motor have additional drawbacks with regard to the winding process. Generally, a slot within the metallic core includes a slot liner that is used for various purposes. For instance, the slot liner may extend beyond the end of a slot to provide insulation and prevent short circuits. However, the slot liners may be damaged during the winding process. Thus, a support is often required during the winding process to prevent the slot liners from being damaged. Conventional methods utilize a cuff support tool, which is attached to the end of the motor for the winding process and is later removed. This additional tool is undesirable and increases the time to manufacture and cost associated with manufacturing the motor.

There is a need, therefore, for an improved technique in forming a stator of an electric motor, generator, or other machine to enable automated winding. There is a particular need for a technique that provides the components and/or a method for automatically assembling and automatically winding an electric motor during the electric motor manufacturing process.

SUMMARY OF THE INVENTION

The present invention provides an improved technique for manufacturing an electric apparatus, such as a motor, generator, and so forth. The technique may be applied in a wide range of settings, but is particularly well-suited for manufacturing electric machines that may be machine wound. The end plates are positioned around a core, which may comprise a group of laminations, and attached together by rods. The end plates and rods are designed to maintain a certain level of pressure on the laminations, where the core is made up of such laminations. Within each of the end plates an insulating end piece or lamination is positioned, which is adjacent to the core or laminations. The core includes slots, which are designed to house coils that extend through the stator. The coils are insulated by slot liners, which are positioned between the coils and the slots. The insulating end pieces provide support to the slot liners and the coils that extend beyond the core or laminations.

The inventive technique offers distinct advantages over existing techniques. For example, the technique enables automated machine winding processes, such as inserting the coils, lacing the coils, and forming the coils. The machine winding processes offer a rapid and cost-effective solution for improved manufacturing of the electric motor. Also, the technique provides for extra insulation between the coils in motor and the end plate or laminations. The technique provides a physical insulating barrier between the coils and other conductive components, which prevents the likelihood of a short circuit occurring. Moreover, the technique provides for additional support of the insulating material, such as slot liners, by providing support to those materials during the manufacturing processes. By supporting the insulating materials, the damage, such as shredding or tearing, is reduced and short circuits are prevented.

BRIEF DESCRIPTION OF THE DRAWINGS

The foregoing and other advantages and features of the invention will become apparent upon reading the following detailed description and upon reference to the drawings in which.

DETAILED DESCRIPTION OF SPECIFIC EMBODIMENTS

Figure 1:
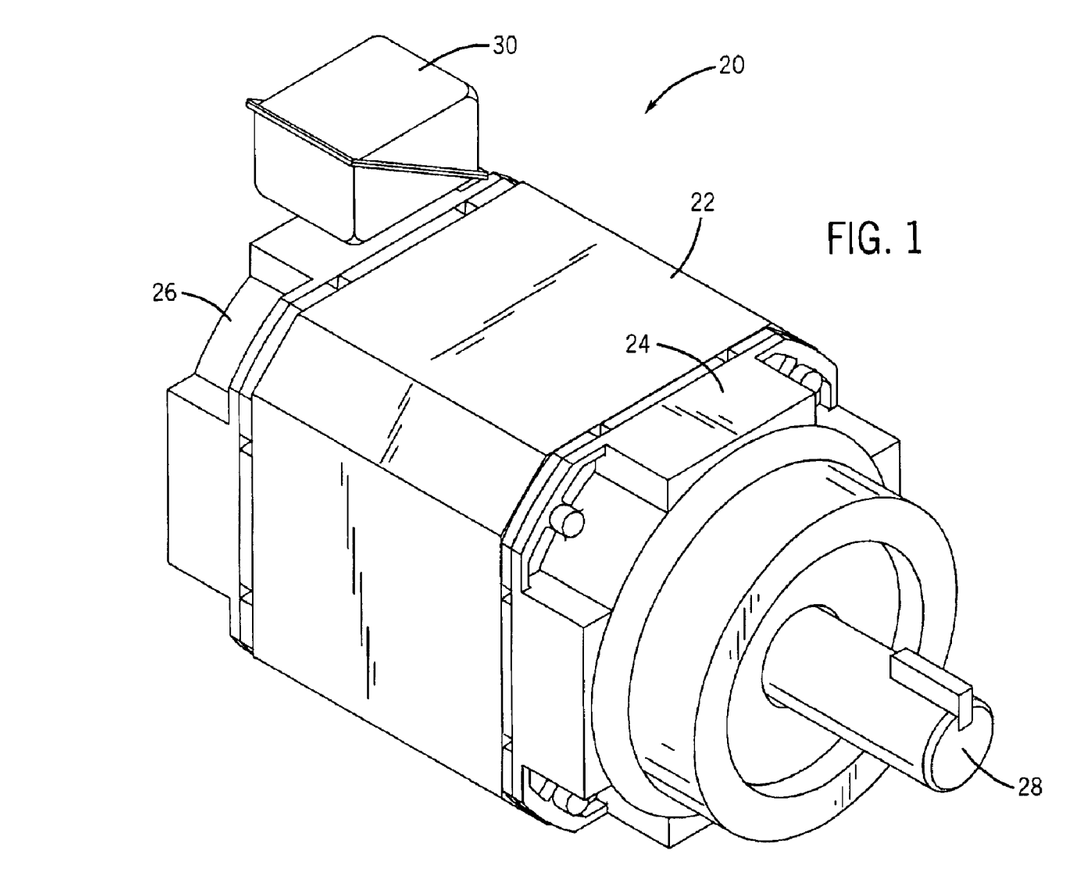
FIG. 1 is a perspective view of an electric motor illustrating the various functional components of the motor in accordance with certain aspects of the invention.

Turning now to the drawings, and referring first to FIG. 1, an electric motor is shown and designated generally by the reference numeral 20. In the embodiment illustrated in FIG. 1, motor 20 is an induction motor housed in a conventional NEMA enclosure. Accordingly, motor 20 includes a frame 22 open at front and rear ends and capped by a front end cap 24 and a rear end cap 26. The frame 22, front end cap 24, and rear end cap 26 form a protective shell, or housing, for a stator and a rotor. Stator windings are electrically interconnected to form groups, and the groups are, in turn, interconnected in a manner generally known in the art. The windings are further coupled to terminal leads (not shown). The terminal leads are used to electrically connect the stator windings to an external power cable (not shown) coupled to a source of electrical power. Energizing the stator windings produces a magnetic field that induces rotation of the rotor and a rotary shaft 28. The electrical connection between the terminal leads and the power cable is housed within a conduit box 30.

In the embodiment illustrated, the rotor may include a cast rotor supported on a rotary shaft 28 within the frame 22 and front end cap 24. As will be appreciated by those skilled in the art, the shaft 28 is configured for coupling to a driven machine element (not shown), for transmitting torque to the machine element. The rotor and the shaft 28 may be supported for rotation within frame 22 by a front bearing set and a rear bearing set carried by the front end cap 24 and the rear end cap 26, respectively. The motor 20 may include a cooling fan within the frame 22 or end caps 24 and 26 to promote convective heat transfer through the frame 22. The frame 22 generally includes features permitting it to be mounted in a desired application, such as mounting bracket or integral mounting feet. As will be appreciated by those skilled in the art, however, a wide variety of rotor configurations may be envisaged in motors that may employ the structures or manufacturing techniques outlined herein, including square motors of the type shown, permanent magnet rotors, and so forth.

Figure 2:
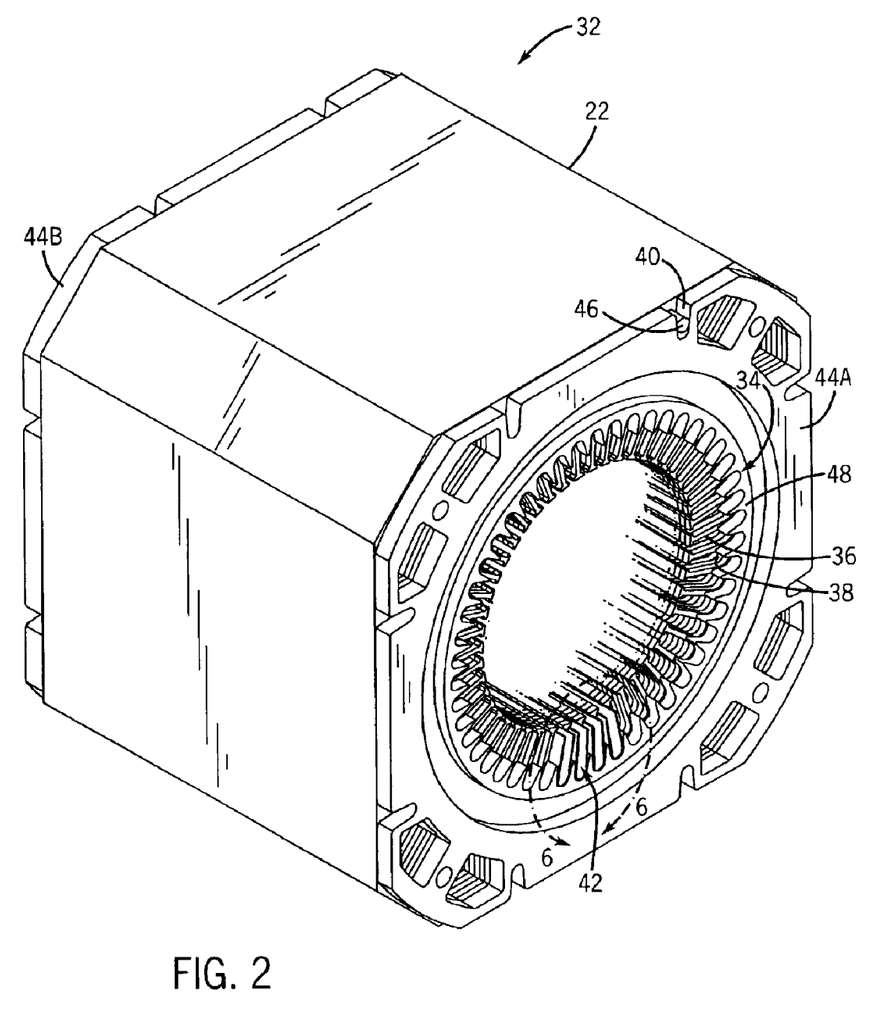
FIG. 2 is a perspective view of the housing and stator core of the electric motor in FIG. 1, illustrating the coupling of the various components of the motor in accordance with certain aspects of the invention.

Referring generally to FIG. 2, a perspective view of a partial motor is shown and designated generally by the reference numeral 32. As depicted in FIG. 2, the frame 22 includes the stator, which is referred to as the stator assembly 34 or stator core. As discussed above, the stator assembly 34 may include a group of laminations 36 which are stacked adjacent to each other, as shown, or a group of segments that extend the entire length of the stator core, or any other suitable configuration. The laminations 36 may be made of a metal material, such as steel or a metal alloy. Each of the laminations 36 has slots 38 and side notches 40 that align with the same features of the other laminations 36 to form continuous slots through the entire length of the stator assembly 34.

In the illustrated embodiment, the laminations 36 thus include internal grooves, in the form of slots 38, and external grooves, in the form of side notches 40. With regard to the slots 38, the general shape of the slots 38 may vary depending on the specific features and design requirements. For instance, the slots 38 may include halved elliptical shapes, halved polygon shapes, or a generally elliptical shape with a portion of one end removed. Each of the slots 38 may include a slot liner 42 disposed within the slot 38 and extending through the entire stator assembly 34. The slot liners 42 may include any insulating material generally known by those skilled in the art. Likewise, the slot liners 42 may include a single insulating layer or multiple layers of insulating material. The slot liners 42 may be as long as the slots 38 or may extend beyond the slots 38. Likewise, the side notches 40 may vary depending on the specific features and design requirements. For example, the side notches 40 may include halved elliptical shapes, a halved polygon shapes, or a halved circular shapes.

Where the core is made up of laminations, the laminations may be kept in a compressed bundle under pressure to maintain a specific form and retain the alignment of the slots 38 and side notches 40. To maintain this lamination pressure, a pair of end plates 44A and 44B may be formed to the same general dimensions as the frame 22. The end plates 44A and 44B are used to hold the laminations 36 of the stator assembly 34 in a generally fixed position. The end plates 44A and 44B are able to maintain pressure on the laminations 36 by being secured to each other on opposite sides of the laminations 36. In the illustrated embodiment, the end plates 44A and 44B are attached by thru rods 46, which pass through the side notches 40 in the laminations 36. The thru rods 46, which may be shown for exemplary purposes by one of the thru rods 46, connect the end plates 44A and 44B, which are able to maintain a lamination pressure on the laminations 36. The thru rods 46 may be attached to the end plates 44A and 44B by welding the components together, by inserting rivets, or by any other suitable means.

As a means of supporting a portion of the slot liners 42 that extend beyond the slots 38, an insulating end piece or insulating end lamination 48 may be positioned between the slot liners 42 and each of the end plate 44A or 44B. The insulating end lamination 48 may include any insulating material, such as a moldable plastic material or composite material or structure, and may be a single continuous component, such as a ring or other shape. Alternatively, the insulating end lamination 48 may be divided into smaller components that support a portion of a slot liner 42 or a group of slot liners 42. The insulating end lamination 48 may be positioned between the end plate 44A and the slot liners 42 without being permanently attached to any specific member. Alternatively, in another embodiment, the insulating end lamination 48 may attach to the slot liners 42, the end plate 44A or 44B, or the one end of the laminations 36.

Figure 3:
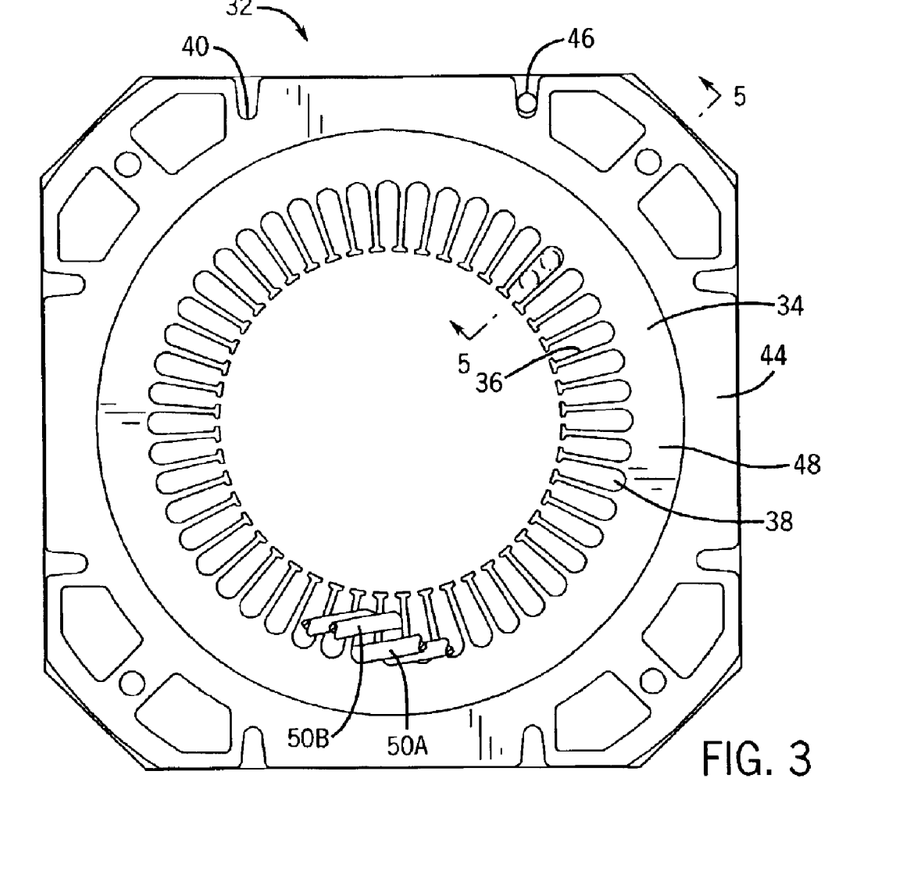
FIG. 3 is a front view of the frame and stator assembly of the electric motor of FIG. 1 and 2.

Referring generally to FIG. 3, an end view of the partial motor 32 is depicted with the components adjacent to the stator assembly 34. As shown in FIG. 3, the end plates 44A and 44B, which may be referenced generically by the reference numeral 44, may be formed to the same general dimensions as the frame 22 and, have a central opening. As the dimension of the frame is adjusted for different purposes, the end plates 44A and 44B may be altered to the same relative shape of the frame 22, or to a cooperatively shade and configuration. Again, in the illustrated embodiment, the end plates 44A and 44B are able to maintain pressure on the laminations 36 by attaching the thru rods 46 to another end plate on the opposite side of the laminations 36 in the side notches 40. Likewise, the end plates 44A and 44B may be attached by thru rods 46 that pass through holes in the laminations 36, or may be a connected to the associated frame 22. The number of thru rods 46 and side notches 40 will be discussed below in greater detail, but they may vary with different designs as will be appreciated by those skilled in the art.

Located within the central opening of each end plate 44A and 44B is the insulating end lamination 48. As discussed above, the insulating end lamination 48 supports the portion of the slot liners 42 that extends beyond the laminations 36. Within each of the slots 38, the stator windings or coils 50 are placed. The stator coils include strands of conductive material, such as copper wire, which are bundled together to form the coil 50. The coils 50 pass thru the slots 38 and are disposed over the slot liners 42. The coils 50 pass through end plates 44A and 44B and the insulating end lamination 48 to extend beyond these components. The method of inserting the coils 50 may vary as will be appreciated by those skilled in the art. Each of the slots 38 may include a single coil 50 or a plurality (typically two) of different coils 50, depending on the specific design. For example, in one embodiment, each of the slots 38 may have two coils 50A and 50B, with each coil 50A or 50B typically extending in opposite directions along the insulating end lamination 48.

Figure 4:
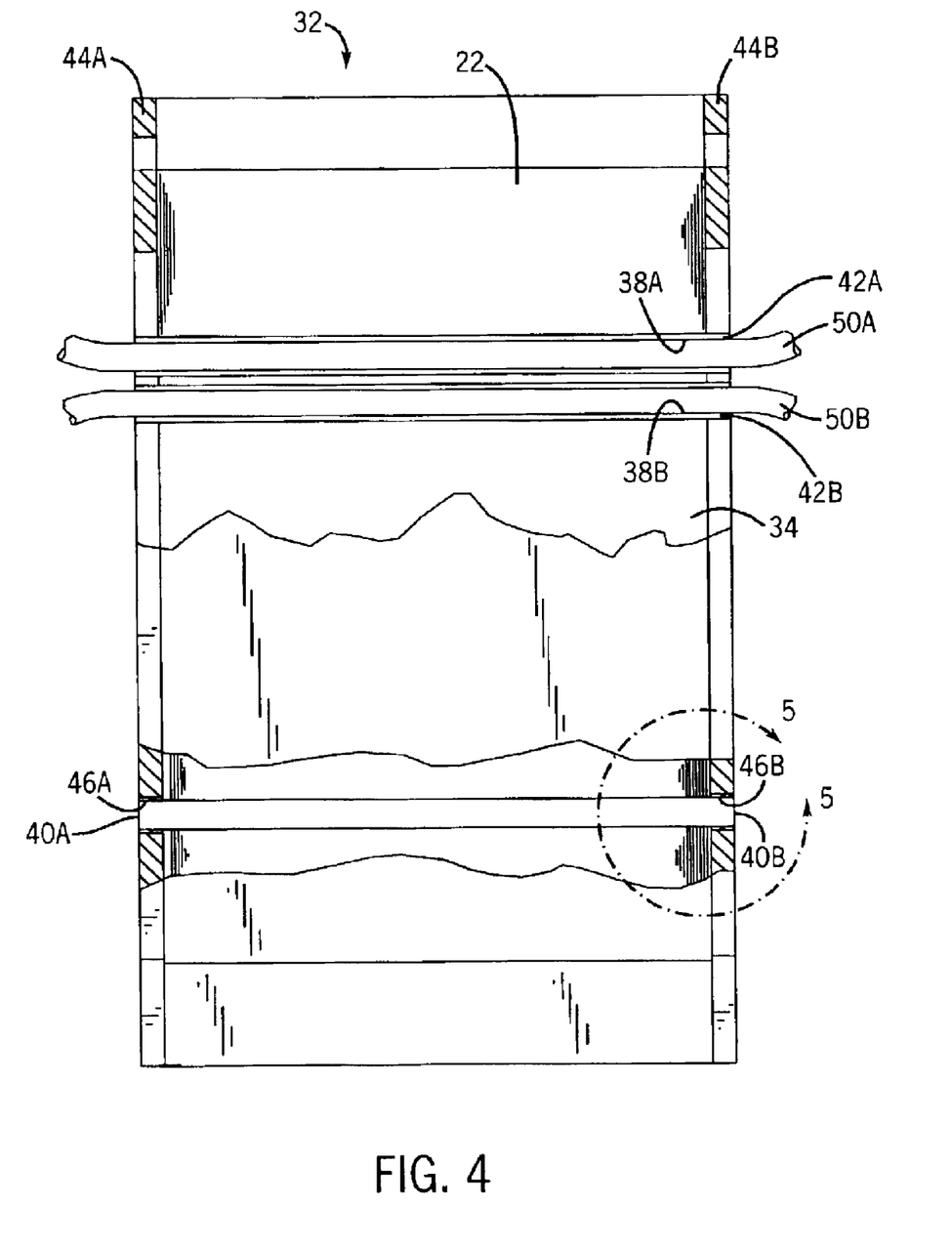
FIG. 4 is a partial sectional view through the frame and stator assembly of FIG. 3.

Referring generally to FIG. 4, a perspective view of the partial motor 32 is depicted with the stator assembly 34, end plates 44, and the frame 22. As shown in FIG. 4, the end plates 44A and 44B are shown with the associated side notches 40A and 40B, which may be referred to generically by the numeral 40, in the laminations 36. The thru rod ends 44A and 46B, which may be the different ends of one of the thru rods 46, are each attached at one end to the end plate 44A and at the other end to end plate 44B. The thru rod ends 46A and 46B pass thru the side notches 40A and 40B to each of the respective end plates 44A and 44B. The thru rod ends 46A and 46B may be attached by welding the thru rod ends 46A and 46B to the end plates 44A and 44B.

Also, FIG. 4 depicts the general manner in which the coils 50 are inserted as illustrated for the specific coils 50A and 50B. In this view, coils 50A and 50B are disposed within different slots 38A and 38B over slot liners 42A and 42B, respectively. The coils 50A and 50B are guided through the slots 38A and 38B and extend beyond the end plate 48B. Once installed in the slots, each of the coils 50A and 50B extends in opposite directions to complete the desired winding pattern. While not shown in this drawing, the coils 50A and 50B will be reinserted into other slots 38 and passed through the slots 38 beyond end plate 44A. Once the coils 50 are inserted, the coils 50A and 50B may be wrapped, such as with string to tie the coils 50 together in bundles. The bundles may then be formed into a specific design or to specific dimensions to complete the stator assembly process.

Figure 5:
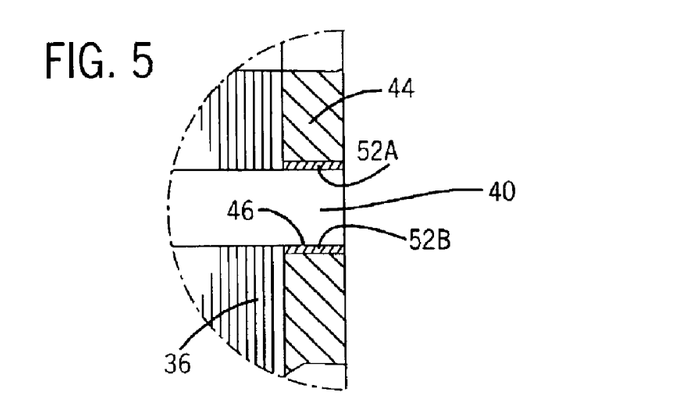
FIG. 5 is a detail view of notches in the core laminations and an end plate to facilitate assembly in one embodiment of the invention.

Turning to a more specific embodiment, FIG. 5 illustrates a detailed portion of the end plate 44 along with the laminations 36 and thru rods 46. The laminations 36 are shown stacked together with the end plate 44 being placed adjacent to them. The side notch 40 of each of the laminations 36 and of the end plate 44 is positioned to form a continuously groove that spans the entire length of the stator assembly 34. The end plate 44 is attached by weld rivets 52A and 52B. The weld rivets 52A and 52B may be used to attach the thru rod 46 to the end plate 44. To maintain the lamination pressure, the laminations 36, rivets 52A and 52B, and end plates 44A and 44B may be clamped in position with a preload or predetermined initial pressure. The rivets 52A and 52B may then be welded between the end plates 44A and 44B and the thru rods 46. Once the welding is complete, the initial pressure is released to a predetermined preload or a second pressure that is lower than the initial pressure before attaching other components. Specifically, in one embodiment an initial pressure at about 20 tons is employed with the second pressure being about 15 tons. Different methods may be implemented to attach the components, such as riveting or welding. With the end plates 44A and 44B attached, the lamination pressure is maintained and the laminations 36 remain in the fixed position.

Advantageously, the illustrated thin end plate motor provides many benefits over conventional motors with regard to both the structure and the method of manufacturing. Unlike larger end plate motors, the thinner end plate does not hinder automated winding processes or require special tooling to enable the motor 20 to be machine wound. In conventional methods, with extra tooling, the cost of manufacturing larger end plate motors is increased as compared to the present structure and techniques. As another advantage over conventional motors, the thin end plate design does not have the same machining or structural issues, encountered with motors made without end plates. The thin end plate motor is able to maintain its structural strength because the end plate reduces the strain on the frame or mechanical structure. Likewise, with the thin end plate design, no specialized machining is used in manufacturing the frame and end plates, which decreases the cost of manufacturing the motors and reduces the specialized machining problems.

Furthermore, the end plate 44 in a thin end plate motor may be manufactured with a small width that does not interfere with an automated machine winding process. Even with this thin end plate, it is still strong enough to be able to maintain the appropriate pressure on the laminations 36. By enabling a machine winding process, the overall cost of manufacturing the motor 20 may be reduced. This reduction is partially due to the fact that automated processes reduce the number of operators that are utilized in the winding process. Thus, the motor 20 is less expensive to manufacture.

As another advantage, the end plates 44A and 44B may be attached by welding the plates together. In conventional motors, bolts are generally used to attach end plates to the frame. However, with the thin end plates 44A and 44B, a weld may be used to attach the thru rods 46 to the end plates 44A and 44B. The welding requires less space and is able to provide the strength required to maintain the lamination pressure without the issues of threading the holes and including space for the portions of the bolt that extend beyond the associated slot. Thus, by welding the thru rods 46 to the end plates 44A and 44B, the thin end plate provides for greater freedom in the design of the motor as compared to other conventional motors.

Figure 6:
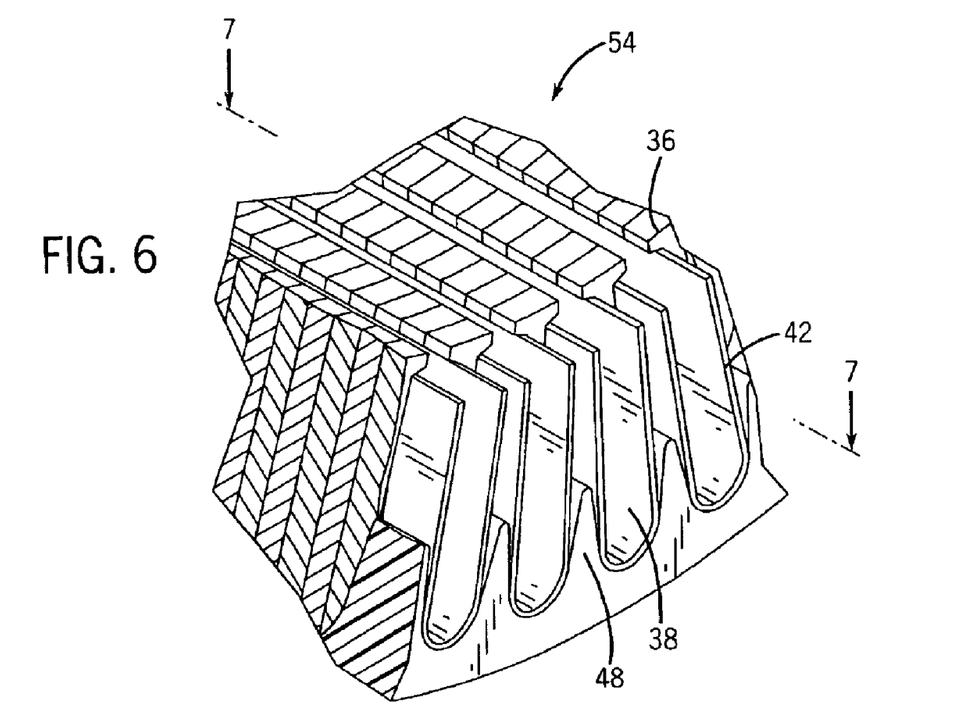
FIG. 6 is a perspective view of the core slots and the associated insulating end piece in accordance with certain aspects of the invention.

Referring generally to FIG. 6, a perspective view of the slots 38 with the associated slot liners 42 and insulating end lamination 48 is shown in this partial stator assembly 54. The slot liners 42 are positioned within the slots 38, but the slot liners 42 may extend beyond the end of the laminations 36. To support the extended portion of the slot liners 42, the insulating end lamination 48 is positioned outside of the slots 38, around a portion of the slots liners 42 that extend beyond the laminations 36, and is within the end plate 44. By locating the insulating end lamination 48 in this orientation, the insulating end lamination 48 is able to support the slot liners 42 during the winding processes, such as inserting of the coils 50, lacing of the coils 50, or forming of the coils 50. During the winding processes, the slot liners 42 may otherwise tear, shred, or become damaged to a degree that slot liner 42 is not able to properly insulate the coils 50. To vary the amount of support or insulation, the insulating end lamination 48 may extend to the top of the slots 38 formed by the laminations 36 or support only the bottom portion of the slot liners 42. These variations may depend upon the coil configuration or other specific design factors.

Figure 7:
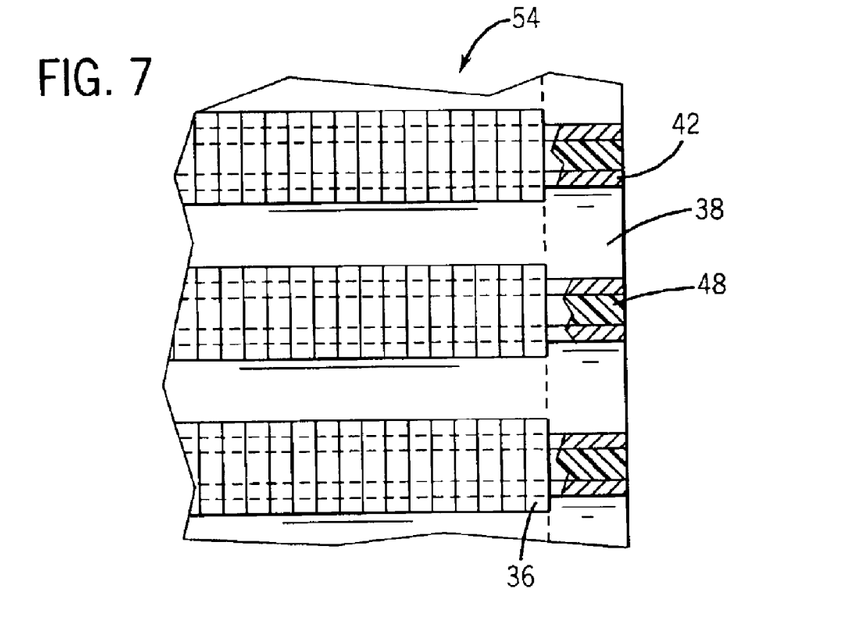
FIG. 7 is a cross-sectional view of a portion of the lamination slots and the associated insulating end piece.

FIG. 7 is a perspective view of the components of the partial stator assembly 54. As shown, the laminations 36 are stacked together with the insulating end lamination 48 being located at the end of the partial stator assembly 54. The slots 38 within the laminations 36 are shown to include the associated slot liners 42. In this perspective view of the partial stator assembly 54, the insulating end lamination 48 is shown to be underlying the slot liners 42 that extend beyond the laminations 36.

Advantageously, the insulating end lamination 48 is able to provide support and insulation for the slot liners 42. The insulating end lamination 48 provides support for the slot liners 42 by acting as a solid base that is able to provide support against various pressures that may be applied to the slot liners 42. For instance, during the winding processes, such as inserting the coils 50, the insulating end lamination 48 may be able to prevent tearing or other damage of the slot liners 42 by providing support to the slot liners 42 while the coils 50 are pulled through the slots 38 and guided to other slots 38. During the insertion process, the pressure on the slot liners 42 will shift in different directions as the coils 50 are pressed into, pulled, and directed to the various slots 38. By preventing damage to the slot liners 42, the insulating end lamination 48 is able to reduce problems associated with manufacturing the motor 20, such as short circuits.

As another advantage, the insulating end lamination 48 or insulating end piece is able to provide additional insulation between the coils 50 and the laminations 36. The insulating end lamination 48 may be a non-conductive material, such as plastic, wood, moldable plastic material, or other suitable insulator. The coils 50 pass through the slots 38 and the insulating end lamination 48, which is located between the coils 50 and the end plate 44. In this configuration, the coils 50 are insulated from physical contact with the end plate 44 because the insulating end lamination 48 provides a physical barrier between the components. Likewise, the insulating end lamination 48 provides a physical barrier between the laminations 36 and the coils 50. The insulating end lamination 36 is positioned adjacent to the laminations 36 and between any coils 50 that extend beyond the laminations 36. Thus, the insulating end lamination 48 is able to provide an insulated buffer between the different conductive materials, such as the coils 50, laminations 36, and the end plate 44.

Figure 8A:
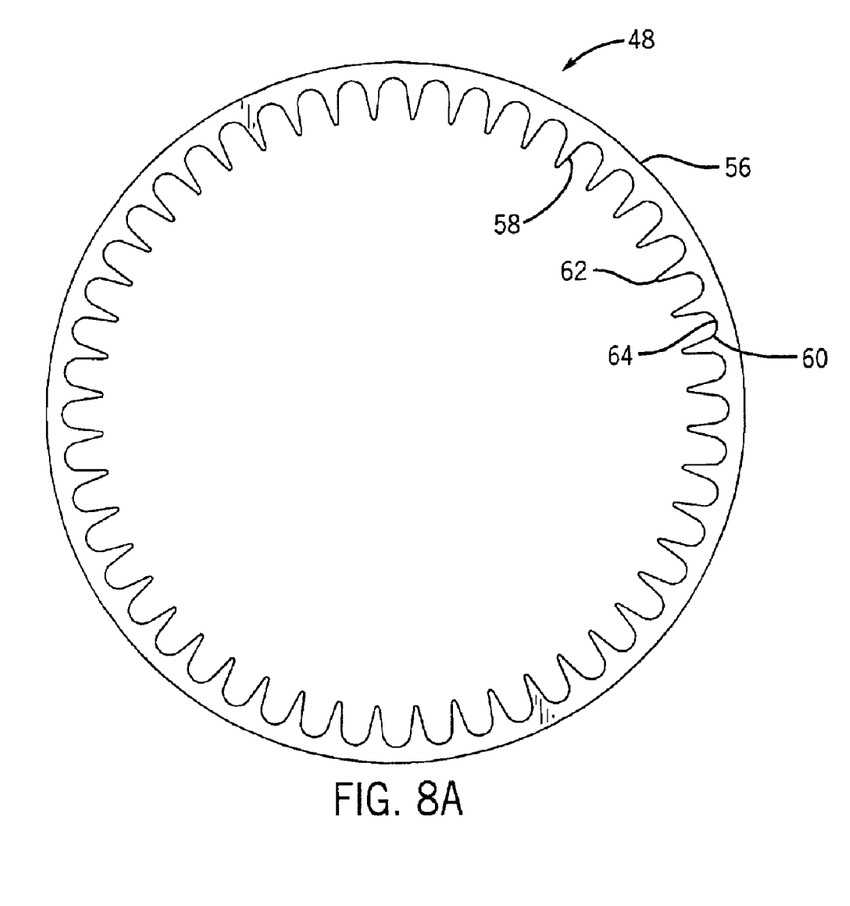
FIGS. 8A and 8B are front and side views of an exemplary insulating end piece or lamination in accordance with certain aspects of the invention.
Figure 8B:
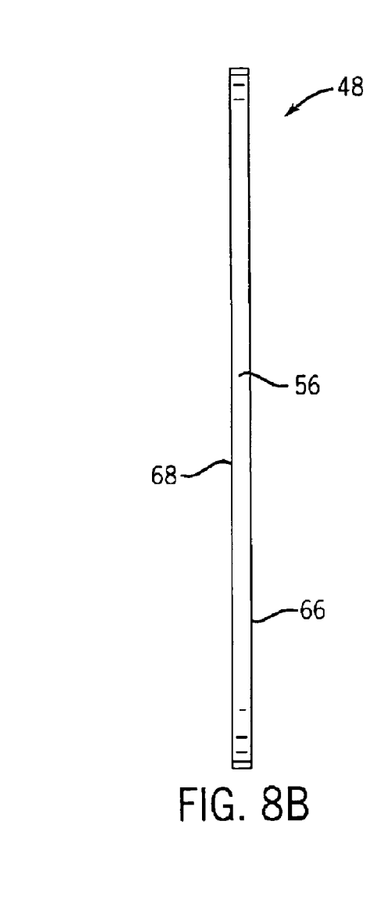

Referring generally to FIG. 8A and FIG. 8B, the insulating end lamination 48 has an outer surface 56 and an inner surface 58. As will be appreciated by those skilled in the art, the general shapes of these surfaces 56 and 58 may vary depending on the specific design of the laminations 36, the end plate 44, the slots 38, and the slots liners 42. Generally, the outer surface 56 is designed in relation to the end plate 44, while the inner surface 58 is designed in relation to the slots 38 and the slot liners 42. Specifically, the outer surface 56 is designed to fit within the end plate 44. The general dimensions will depend on the design of end plate 48. The inner surface 58 of the insulating end lamination 48 is designed to mimic the number of slots 38 or holes within the laminations 36 of the stator assembly 34. As will be appreciated by those in the art, the number of end laminate slots 60 or holes will depend on a given design preference and may vary from one design to another.

In one specific embodiment, as depicted in FIG. 8A, the number of slots 38 formed in the laminations 36 may include 48 evenly spaced slots 38. The insulating end lamination 48 in this embodiment has a generally circular outer surface 56. The diameter of the outer surface 56 may vary depending on the specific design requirements. With regard to the inner surface 58, the formation of the inner surface will generally include end lamination slots 60. With the number of slots 38 in the laminations 36 being 48 evenly spaced, the inner surface 58 may have a design similar to that of the laminations, so as to provide support to liners placed in the 48 evenly spaced slots 38. In the general embodiment of FIG. 8A, the inner surface 58 includes end lamination slots 60 which have a top portion 62 and a bottom portion 64. The top portion 62 may extend to the top of the slot 38 in the laminations 36 to provide support to all of the slot liners 42 or extend along a portion of the slot 38 to support a portion of the slot liners 42. Likewise, the top portion 62 may be curved, sloped, relatively flat, or flat. The bottom portion 64 may follow the exact shape of the slot 38 to be able to provide maximum support to the slot liners 42. Similarly, the bottom portion 64 may be curved, sloped, relatively flat, or flat, depending on the specific design. However, the bottom portion 64 of the end lamination slots 60 may be designed to conform to any geometrical shape that is consistent with the slots 38.

Turning to FIG. 8B, a side view of the insulating end lamination 48 is shown. In this side view of the insulating end lamination 48, the outer surface 56 is shown. As shown, the insulating end lamination 48 has a first side 66 and a second side 68. The design of the first side 66 or the second side 68 may vary depending on the laminations 36, which may interface with the one of the sides 66 or 68. If the laminations 36 have a slope or other features, one of the sides 66 or 68 may be altered to interface with the laminations 36 in an appropriate manner. The distance between the first side 66 and the second side 68 may be defined as the width of the insulating end lamination 48. As discussed above, depending on the actual shape of the first side 66 and the second side 68, the width of the insulating end lamination 48 may vary or be generally constant in different embodiments. In one specific embodiment, the sides 66 and 68 may be generally flat or planar, with the width of the insulating end lamination 48 being about 0.25 inches. However, the width of the insulating end lamination may vary depending on specific requirements or different design criteria as appreciated by those skilled in the art.

Figure 9A:
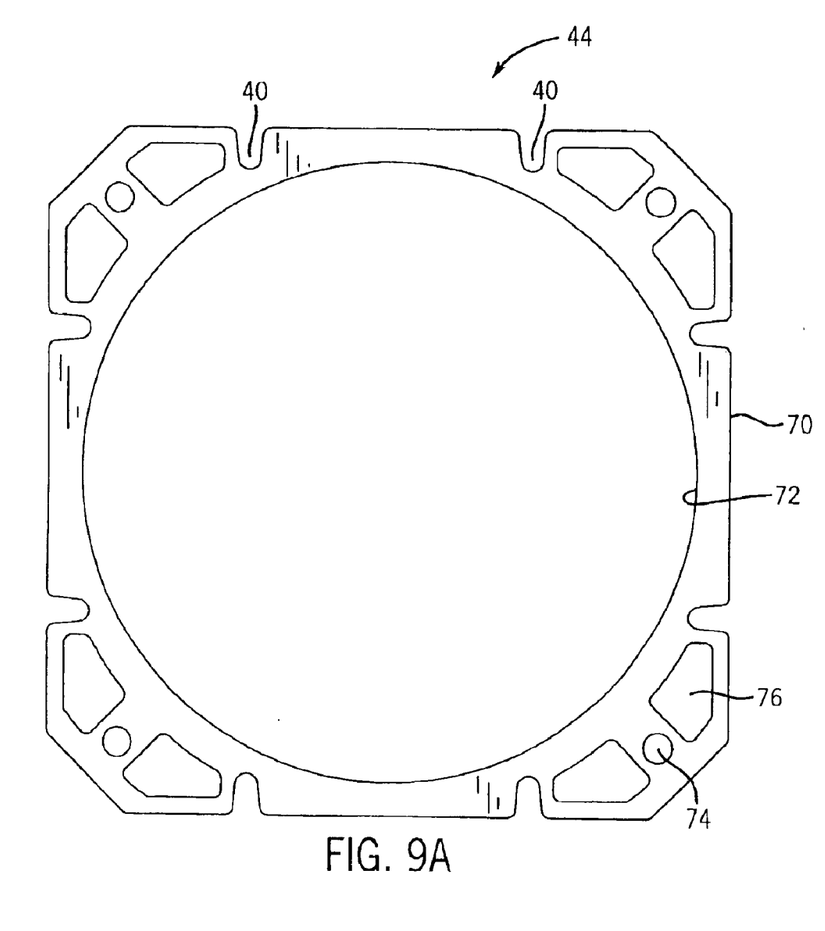
FIGS. 9A and 9B are front and side views of an exemplary end plate in accordance with certain aspects of the invention.
Figure 9B:
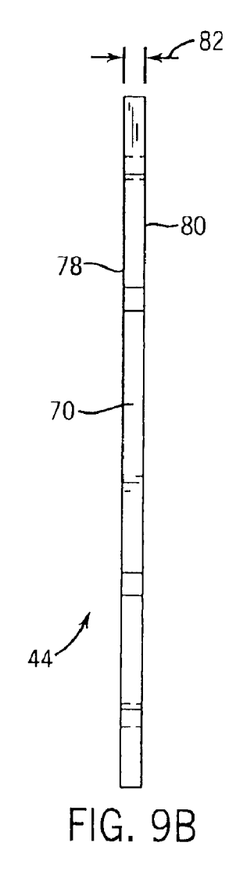

Referring generally to FIG. 9A and FIG. 9B, these figures depict different views of one embodiment of the end plate 44. The end plate 44 may be formed from steel, cast iron, or any other suitable material. As shown in FIG. 9A, end plate 44 has an end plate outer surface 70 and an end plate inner surface 72, defining a central opening. As will be appreciated by those skilled in the arts the general shapes of these end plate surfaces 70 and 72 may vary depending on the specific design of the frame 22, the laminations 36, and the stator assembly 34. Generally, the end plate outer surface 70 may be designed with regard to the frame 22 of the motor 20 and the laminations 36. Typically, the end plate 44 is designed to follow the contours of the frame 22 and is located adjacent to the frame 22. Also, the end plate 44 may be designed in relation to the laminations 36. With the end plate 44 being used to maintain pressure on the laminations 36, the end plate outer surface 70 generally extends beyond the laminations 36 to provide extra strength. However, the end plate outer surface 70 may expose portions of the laminations 36 in other embodiments.

The end plate 44 may have notches 40 or curvatures formed in the end plate outer surface 70 to enable the attachment of thru rods 46 to the end plate. Likewise, the notches 40 may be used to enable objects, such as an air passage or a cable, to pass through the frame 22 and the laminations 36. As noted above, the notches 40 may vary in shape or quantity for different designs depending on the specific requirements. For example, the notches 40 may be an elliptical shape, a square shape, or a circular hole through the end plate 44.

While the frame 22 may impact design of the end plate outer surface 70 of the end plate 44, the inner end plate surface 72 is designed with regard to the laminations 36, the slots 38, and the insulating end lamination 48. The end plate inner surface 72 of the end plate 44 is designed not to block or interfere with the slots 38 in the laminations 36, while being disposed adjacent to a portion of the laminations 36 to maintain the lamination pressure. In a high pressure embodiment, the end plate inner surface 72 may be closer to the slots 38 to provide more strength. Conversely, in a lower pressure embodiment, the end plate inner surface 72 may be further from the slots 38 and cover a smaller portion of the laminations 36. The specific contour of the end plate inner surface 72 may vary depending on the specific requirements for a given design. For example, the end plate inner surface 72 may be a generally circular surface, polygon shape, or other shape as appreciated by those skilled in the art.

In addition to the end plate surfaces 70 and 72, holes 74 and 76 may be cut into the end plate 44 between the end plate inner surface 72 and the end plate outer surface 70. These holes 74 and 76 may be circular, oval, or any generic shape. The holes 74 and 76 may enable airflow through the motor 20 or provide a means of attaching other components. For example, first hole 74 may enable the attachment of additional equipment, such as a rotor assembly or a fan. Similarly, second hole 76 may be provided to enable airflow through the frame of the motor to enable cooling the motor 20.

Turning to FIG. 9B, a side view of the end plate 44 is illustrated. As shown, the end plate 44 has a first end plate side 78 and a second end plate side 80. The design of the first end plate side 78 or the second end plate side 80 may vary depending upon the configuration of the laminations 36 and the frame 22, which may interface with the one of the sides 78 or 80. If the laminations 36 or the frame 22 have a slope or other features, then one of the sides 78 or 80 may be altered to interface with the laminations 36 or frame 22 in an appropriate manner. The distance between the first end plate side 78 and the second end plate side 80 may be defined as the width 82 of the end plate 44. As discussed above, depending on the actual shape of the first end plate side 78 and the second end plate side 80, the width 82 of the end plate 44 may vary or be generally constant in different embodiments. In one specific embodiment, the sides 78 and 80 may be generally flat with the width of the end plate 44 being about 0.31 inches. However, the width 82 of the end plate 44 may vary depending on specific requirements or different design criteria as appreciated by those skilled in the art.

In one specific embodiment, the end plate outer surface 70 may be a generally square including four longer sides with the corners removed at a 45° to form four short corner sides. The resulting shape may be a generally octagonal shape, which has four long sides and four short sides. The end plate 44 may have two notches 40 on each of the longer sides that are formed in the shape of a half oval. Each of the notches 40 may be used to secure a thru rod 46 to one side of the end plate 44. The end plate inner surface 72 of the end plate 44 may have a generally circular from. In addition to the notches 40, the end plate 44 may have one circular first hole 74 and two generally trapezoidal second holes 76 located in the corners between the short side and the end plate inner surface 72. The first end plate side 78 and the second end plate side 80 may be generally flat with a width in a range of about 0.2 inches to about 0.5 inches or more specifically about 0.31 inches.

While the invention may be susceptible to various modifications and alternative forms, specific embodiments have been shown in the drawings and have been described in detail herein by way of example only. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An electric apparatus comprising:
   a first end plate and a second end plate, each end plate having a central opening;

a plurality of rods attached to the first end plate and to the second end plate;

a plurality of laminations between the first end plate and the second end plate;

a first insulating end lamination disposed only axially and radially within the central opening of the first end plate and adjacent to one side of the plurality of laminations; and a second insulating end lamination disposed only axially and radially within the central opening of the second end plate and adjacent to a second side of the plurality of laminations.

2. The electric apparatus of claim 1, further comprising a square frame.

3. The electric apparatus of claim 1, wherein the first end plate and the second end plate are attached to the rods by welding.

4. The electric apparatus of claim 1, wherein the first end plate and the second end plate comprise steel.

5. The electric apparatus of claim 4, wherein the first end plate and the second end plate comprise a width from 0.2 inches to 0.5 inches.

6. An electric apparatus comprising:

a plurality of end plates, each end plate having a central opening;

a plurality of laminations between the plurality of end plates, wherein the plurality of laminations further comprise a plurality of slots;

a first insulating end lamination disposed only axially and radially within the central opening of one of the plurality of end plates and adjacent to one side of the plurality of laminations; and a second insulating end lamination disposed only axially and radially within the central opening of the other of the plurality of end plates and adjacent to a second side of the plurality of laminations;

the first and second insulating end laminations each including a plurality of slots aligned with the slots of the plurality of laminations.

7. The electric apparatus of claim 6, further comprising a square housing.

8. The electric apparatus of claim 6, comprising a plurality of coils disposed in the slots, the first and second insulating end laminations separating the coils from the end plates.

9. The electric apparatus of claim 6, comprising a plurality of coils disposed in the slots, the first and second insulating end laminations separating the coils from the other laminations.

10. The electric apparatus of claim 6, wherein the insulating end laminations are made of a moldable plastic material.

11. The electric apparatus of claim 6, comprising a plurality of slot liners disposed within the plurality of slots, the slot liners being at least partially supported by the first and second insulating end laminations.

12. The electric apparatus of claim 10, wherein at least a portion of the plurality of slot liners are disposed over the first insulating end lamination and the second insulating end lamination.

13. The electric apparatus of claim 12, wherein at least a portion of the plurality of slot liners extend beyond the plurality of laminations and are disposed over the first insulating end lamination and the second insulating end lamination.

14. An electric apparatus comprising:

a first end plate and a second end plate, each end plate having a central opening;

a stator core disposed between the first end plate and the second end plate, the stator core comprising a plurality of slots;

a first insulating end piece having a plurality of slots disposed only axially and radially within the central opening of the first end plate and adjacent to stator core;

a second insulating end piece having a plurality of slots disposed only axially and radially within the central opening of the second end plate and adjacent to stator core; and a plurality of coils disposed in the plurality of slots of the core, the first insulating end piece, and the second insulating end piece.

15. The electric apparatus of claim 14, wherein the core comprises a plurality of laminations.

16. The electric apparatus of claim 14, wherein the first and second insulating end pieces are rings.

17. The electric apparatus of claim 14, wherein the first and second insulating end pieces are generally planar.

18. The electric apparatus of claim 14, comprising a plurality of slot liners disposed within the plurality of slots, the slot liners being at least partially supported by the first and second insulating end pieces.

19. The electric apparatus of claim 18, wherein at least a portion of the plurality of slot liners are disposed over the first insulating end lamination and the second insulating end piece.

20. The electric apparatus of claim 19, wherein at least a portion of the plurality of slot liners extend beyond the plurality of laminations and are disposed over the first insulating end piece and the second insulating end piece.

21. The electric apparatus of claim 14, wherein the first and second insulating end pieces comprise a moldable plastic material.

* * * * *